(12) United States Patent
Hazama

(10) Patent No.: US 6,256,123 B1
(45) Date of Patent: *Jul. 3, 2001

(54) PROJECTION LIQUID CRYSTAL DISPLAY APPARATUS, PROCESS FOR PRODUCING HOLOGRAPHIC OPTICAL ELEMENT FOR USE IN THE DISPLAY APPARATUS AND HOLOGRAPHIC OPTICAL ELEMENT PRODUCED BY THE METHOD

(75) Inventor: Yoshikazu Hazama, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/912,667

(22) Filed: Aug. 18, 1997

(30) Foreign Application Priority Data

| Aug. 21, 1996 | (JP) | 8-238453 |
| Aug. 21, 1996 | (JP) | 8-238454 |
| Aug. 21, 1996 | (JP) | 8-238455 |

(51) Int. Cl.$^7$ ........................................ G03H 1/30
(52) U.S. Cl. .................. 359/25; 359/15; 359/28; 349/5; 349/62; 349/704
(58) Field of Search ................ 359/15, 22, 24, 359/25, 28; 349/5, 8, 62, 84, 95, 104, 106

(56) References Cited

U.S. PATENT DOCUMENTS 4,964,684 * 10/1990 Iovine ................................ 359/23

(List continued on next page.)

FOREIGN PATENT DOCUMENTS

| 2-089081A | 3/1990 | (JP) . |
| 6-281932A | 10/1994 | (JP) . |
| 8-146419A | 6/1996 | (JP) . |
| 8-152594A | 6/1996 | (JP) . |

*Primary Examiner*—Darren Schuberg
(74) *Attorney, Agent, or Firm*—Ronald P. Kananen; Rader, Fishman & Grauer

(57) ABSTRACT

A projection liquid crystal display apparatus has a light source for emitting white light and a liquid crystal display unit, between which a holographic optical element serving as the color separating/focusing means is disposed. Upon receipt of the white light, the holographic optical element performs separation into light components of the primary colors of red, green and blue, at angles corresponding to the arrangement of the pixels on the liquid crystal display unit so as to direct these primary color light components to pixels of the corresponding colors, an whereby image to be reproduced (real image) is formed on the liquid crystal display unit. The holographic optical element is produced by using the liquid crystal display unit as an exposure mask. Pixels of a specific color on the liquid crystal display unit are set to a transmissive state while other pixels are set to a non-transmissive state, and light of the specific color is applied as an object light to the substrate member through the liquid crystal display unit. At the same time, a reference light is applied to the same substrate member, so that interference fringes are formed by interference between these reference light and the object light. The same operation is conducted for other colors so that interference fringes corresponding to other colors are also formed, whereby the holographic optical element is produced. It is possible to use, in place of the liquid crystal display unit, a color filter having the same arrangements of pixels and colors as those of the liquid crystal display unit, as the exposure mask in the production of the holographic optical element. The interference fringes may be so formed that the holographic optical element directs at least one of the primary color light components out of the plane in which the light components of other primary colors are directed, or complementary color light components are deviated from the plane through which the primary color light components are directed to the liquid crystal display unit.

9 Claims, 10 Drawing Sheets

U.S. PATENT DOCUMENTS

| | | | |
|---|---|---|---|
| 5,506,701 | * | 4/1996 | Ichikawa ................................. 359/15 |
| 5,537,232 | | 7/1996 | Biles ...................................... 359/15 |
| 5,760,850 | * | 6/1998 | Nakanishi et al. ....................... 349/5 |

* cited by examiner

PROJECTION LIQUID CRYSTAL DISPLAY APPARATUS, PROCESS FOR PRODUCING HOLOGRAPHIC OPTICAL ELEMENT FOR USE IN THE DISPLAY APPARATUS AND HOLOGRAPHIC OPTICAL ELEMENT PRODUCED BY THE METHOD

BACKGROUND OF THE INVENTION

1. Field of the Invention

The present invention relates to a projection liquid crystal display apparatus which incorporates a holographic optical element serving as color separation means. More particularly, the present invention relates to a projection liquid crystal display apparatus incorporating a holographic optical element having a function to focus reproduced images on each pixel of a liquid crystal display unit.

The present invention is also concerned with a process for producing the holographic optical element described above, as well as to a holographic optical element produced by the process.

2. Description of the Related Art

Liquid crystal display devices can be sorted into two types: namely, a so-called direct view type display apparatus in which an image formed on a liquid crystal display unit, e.g., a liquid crystal light valve or a liquid crystal display panel, is directly viewed, and a so-called projection type display apparatus, referred to as liquid crystal projector, in which an image is projected and displayed on a screen. In the operation of a projection liquid crystal display apparatus, white light emitted from a light source is separated into primary colors for color display, and the light of each color is guided to a pixel (liquid crystal cell) of a liquid crystal display unit which corresponds to the color of the light. The light is modulated in this pixel in accordance with the image to be reproduced, and the modulated light is projected on a screen so that a color image can be displayed on the screen at a greater scale. Such projection liquid crystal display apparatuses also can be sorted into two types: a single-sheet type which employs a single sheet of liquid crystal display unit having a tri-color separation means for separating white light into three colors of red (R), green (G) and blue (B), and a triplet sheet type which employs three sheets of monochromatic liquid crystal display units for the light paths of red, green and blue colors.

In most cases, liquid crystal display units developed for use in direct view type apparatuses are conveniently used as the single sheets of liquid crystal display units in projection liquid crystal display apparatus of single-sheet type. In general, such a liquid crystal display units primarily intended for use in direct view type display apparatuses has color filters adhered to realize the required color display.

Conventional liquid crystal display apparatuses employing color filters bonded to the liquid crystal display units have suffered from the following problems. In this type of display apparatus, a red color filter is disposed on a pixel which is intended to display red color. This red color filter inconveniently absorbs or reflects light of other colors, i.e., green and blue. This is also the cases of other color filters, i.e., green and blue color filters. Thus, the known display apparatus of the type described could use only ⅓ the light rays incident to the liquid crystal display unit. Thus, the efficiency of use of the light is lower than that in projection liquid crystal display apparatus of triplet sheet type using the same light source. For the same reason, the brightness of the display on the screen is reduced to ⅓. It would be possible to enhance the brightness by increasing the power of the light source, but such a countermeasure undesirably incurs a temperature rise due to absorption of light. This means that the liquid crystal display unit of the type having color filters encounters a practical limit in the brightening of the display.

In order to obviate the disadvantage of the color filters, a method has been proposed in, for example, Japanese Patent Laid-Open No. 4-60538, in which dichroic mirrors and microlenses are combinedly used in place of the color filters so as to realize color display. More specifically, in which method, white light emitted from a light source is separated into three color components by means of dichroic mirrors which are slanted differently for three primary colors, and the separated color light rays are made to be incident to the corresponding pixels of the liquid crystal display unit through the microlenses. This color displaying method, however, involves problems such as increase in the size of the optical system, reduction in the color purity due to mixing of color, i.e., noise, and so forth. In addition, the whole display apparatus becomes costly due to the use of expensive microlenses.

The method relying upon the use of dichroic mirror and microlenses further suffers from the following disadvantage. Namely, the color separation into three primary colors of red, green and blue, performed by dichroic mirrors, is possible only in a common plane. Consequently, the pixels on the liquid crystal display unit can be arranged only linearly, e.g., along a horizontal line and along a line perpendicular thereto. The use of a liquid crystal display unit having such linear pixel arrangement poses a restriction in the construction of the optical system. In addition, the microlenses have to be shaped linearly in accordance with the pixel arrangement on the liquid crystal display unit, with the result that a difficulty is encountered in the production of the microlenses. On the other hand, the liquid crystal display unit employs a so-called delta or triangle pixel arrangement in which pixels of red, green and blue colors are arranged to form a triangular pixel module, the size of each microlens corresponding to each triangular pixel module has to be increased beyond the size actually required, with the result that a wasteful portion which does not contribute to the condensation of light is inevitably involved in each microlens.

Still further problem encountered by this type of projection liquid crystal display apparatus is that, when a light source which emits white light is used, color purity is undesirably impaired due to presence of complementary color components.

SUMMARY OF THE INVENTION

Accordingly, it is an object of the present invention to provide an inexpensive projection liquid crystal display apparatus in which a holographic optical element is used as color separation-means so as to achieve a high efficiency of use of light, as well as miniaturization of the structure, while suppressing reduction in the color purity attributable to color mixing.

Another object of the present invention is to provide a process for producing a holographic optical element which enables easy implementation of the projection liquid crystal display apparatus set forth above.

A still another object of the present invention is to provide a process for producing a holographic optical element for use in a projection liquid crystal display apparatus that implements color separation conforming with the arrangement of the pixels on the liquid crystal display unit and that permits microlenses as light condensing means to be configured in accordance with the pixel arrangement so as to offer high light condensing efficiency and easy manufacture of the microlenses.

A further object of the present invention is to provide an inexpensive projection liquid crystal display apparatus which incorporates a holographic optical element as color separating means, so as to improve efficiency of use of the light from the source and to reduce restriction which is posed when the color separating means is incorporated in the apparatus, while eliminating or suppressing mixing of color attributable to the presence of complementary color components.

To these ends, according to one aspect of the present invention, there is provided a projection liquid crystal display apparatus, comprising: a light source for emitting white light; a liquid crystal display unit having arrays of a plurality of pixels corresponding to primary colors for color display; color separation/focusing means for separating the white light from the light source into a plurality of light rays of different primary colors in conformity with the arrays of pixels on the liquid crystal display unit, and for focusing an image reproduced by the light rays on the liquid crystal display unit, the color separation/focusing means comprising a holographic optical element having interference fringes conforming with arrays of pixels and colors on the liquid crystal display unit; a projection lens which projects the image synthesized on the liquid crystal display unit; and a screen on which the image is projected through the projection lens and displayed at a greater scale.

According to another aspect of the present invention, there is provided a process for producing a holographic optical element for use as a color separating/focusing means in a projection liquid crystal display apparatus which includes a liquid crystal display unit having arrays of a plurality of pixels corresponding to primary colors for color display, the method comprising the steps of: preparing an exposure mask having a structure conforming with the arrays of pixels on the liquid crystal display unit; and selectively exposing a substrate of the holographic optical element to be formed, through the exposure mask, whereby the arrays of reproduced images conform with the arrays of pixels on the liquid crystal display unit.

The exposure mask may comprise a liquid crystal display unit of a projection liquid crystal display apparatus.

When such a liquid crystal display unit is used as the exposure mask, the method may comprise the steps of: setting the pixels corresponding to a first color into transmitting state among the pixels of the liquid crystal display unit; allowing light of a specific color as an object light to be transmitted trough the liquid crystal display unit; applying the object light to the substrate of the holographic element together with a reference light so as to form interference fringes; and executing the same steps for pixels of a second color so as to form interference fringes corresponding to the second color.

Alternatively, the exposure mask may comprise a color filter having the same arrays of pixels as those of a liquid crystal display unit of a projection liquid crystal display apparatus.

When such a color filter is used as the exposure mask, the method may be such that light of each color transmitted through the color filter is applied together with a reference light to the substrate, thereby forming interference fringes corresponding to each color.

In operation of the projection liquid crystal display apparatus of the present invention, white light emitted from the light source is separated into light rays of primary colors by means of a holographic optical element on which are formed interference fringes which conform with the arrays of pixels and colors on the liquid-crystal display unit, and images reproduced by these light rays are focused on the liquid crystal display unit.

According to still another aspect of the present invention, there is provided a process for producing a holographic optical element in a projection liquid crystal display apparatus of the type having a light source for emitting white light, a liquid crystal display unit having a regular arrangement of a plurality of pixel modules each of which includes a plurality of pixels arrayed both in a first arraying direction and a second arraying direction orthogonal to the first arraying direction, and the holographic optical element which separates the white light from the light source into a plurality of primary color light components in accordance with the arrays of pixels and directs the separated primary color light components to the liquid crystal display unit, and which has a plurality of interference fringes corresponding to the plurality of pixels, the process comprising the step of: forming the interference fringes on a substrate member for forming the holographic optical element, the forming step including: applying a reference light to the substrate member, such that the reference light is within a plane which contains a direction corresponding to the first direction of the arraying of the pixels of the liquid crystal display unit, and in a direction which forms an angle corresponding to the angle of incidence of the white light from the light source; applying to the substrate member an object light for forming an interference fringe corresponding to a pixel of a type arrayed in the first arraying direction among the pixels constituting the pixel module, in the same plane as the reference light and so as to form, with respect to the reference light, an angle corresponding to the arraying of the pixel; and applying to the substrate member an object light for forming an interference fringe corresponding to other type of pixels arrayed in the second arraying direction in the pixel module of the liquid crystal display unit, in a directions which forms, with respect to the reference light, an angle corresponding to the arraying of the pixel in the second arraying direction.

The pixel arrangement may be the so-called delta arrangement in which each pixel module comprises first and second pixels of first and second primary colors, juxtaposed in the first direction, and a third pixel of the third primary color juxtaposed to the first and second pixels in such a manner that the centers of the first to third pixels form a triangle.

The liquid crystal display unit may comprise a microlens which serves as light condensing means for each pixel module.

According to the described process of still another aspect, interference fringes are formed on the substrate member which is to constitute the substrate of the holographic optical element, in conformity with a plurality of pixels arranged in the first and second directions, respectively. When a holographic optical element having such interference fringes is used, the white light emitted from the light source is separated into a plurality of primary color light components in conformity with the form of arrangement of pixels, e.g., a delta pixel arrangement, on the liquid crystal display unit, and the primary color light components thus separated are directed to corresponding pixels on the liquid crystal display unit.

According to a further aspect of the present invention, there is provided a projection liquid crystal display apparatus, comprising: a light source for emitting white light; a liquid crystal display unit having arrays of a plurality of pixels corresponding to primary colors for color display; a holographic optical element which receives the white light and separates the white light into light components corresponding to the primary colors and directs the separated primary color light components to the liquid crystal display unit, while directing complementary color light components to areas out of the area of the liquid crystal display unit; a projection lens for projecting an image synthesized in the liquid crystal display unit from the primary color light components; and a screen for displaying an image projected through the projection lens at a greater scale.

The complementary color components may include cyan and yellow light components.

In the projection liquid crystal display apparatus in accordance with the further aspect, the white light emitted from the light source enters the holographic optical element which serves as the color separating means. The holographic optical element separates the primary color components of red, green and blue colors from one another and directs these primary color light components to the liquid crystal display unit. However, complementary color components, in particular cyan and yellow color components which cause color mixing among the above-mentioned primary colors, are directed to areas out of the area of the liquid crystal display unit. The primary color light components introduced to the liquid crystal display unit are modulated in this unit in accordance with the image to be reproduced. The modulated color light components are projected on a screen, whereby a color image is displayed on the screen.

Preferred embodiments of the present invention will now be described with reference to the accompanying drawings.

DESCRIPTION OF THE PREFERRED EMBODIMENTS

Figure 1:
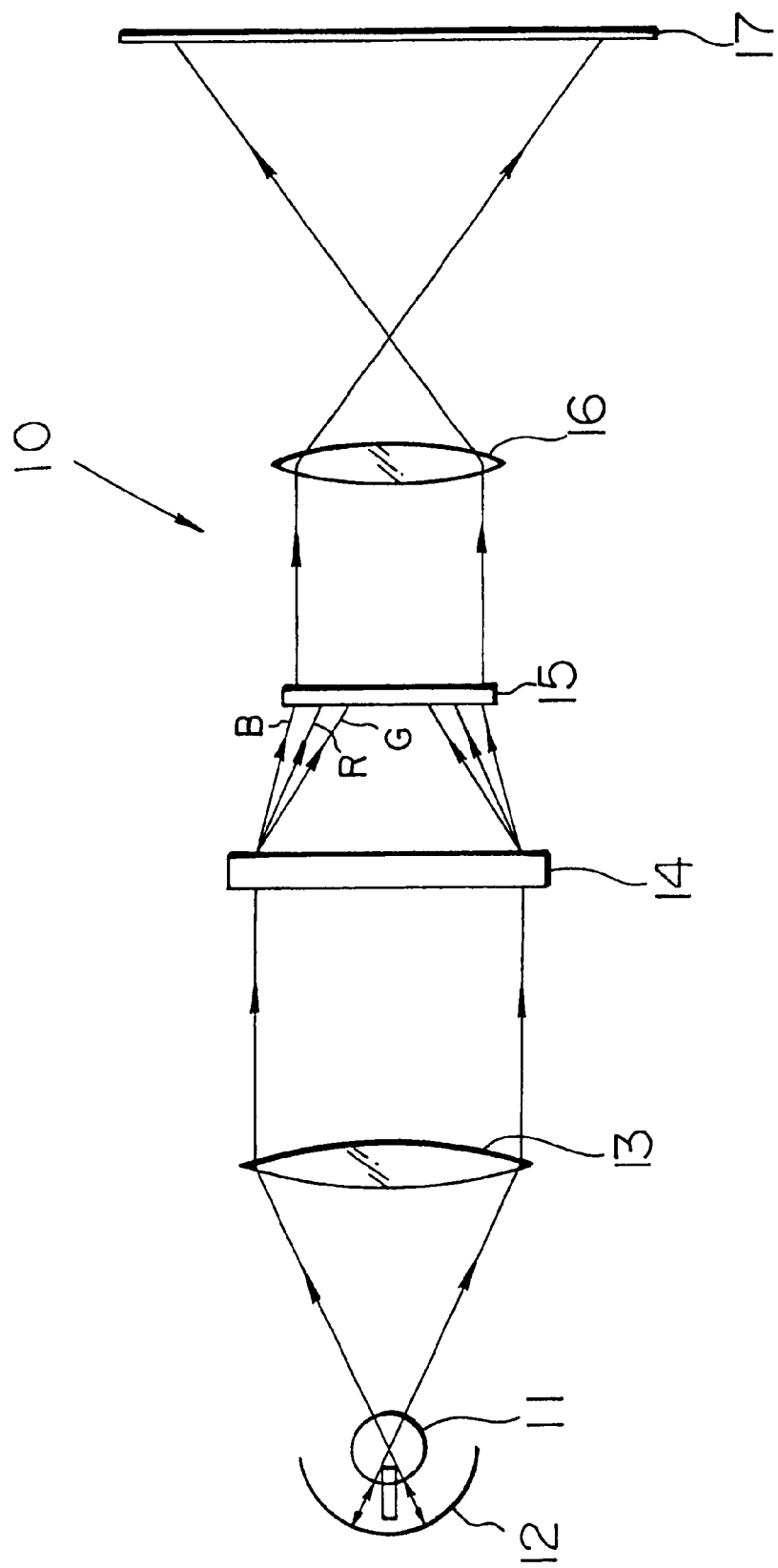
FIG. 1 is a schematic illustration of the whole structure of an embodiment of the projection liquid crystal display apparatus in accordance with the present invention.

Referring to FIG. 1, an embodiment of the projection liquid crystal optical system is schematically shown and generally denoted by a numeral 10. The projection liquid crystal display apparatus 10 has a light source 11 for emitting white light, a reflector 12 which is disposed behind the light source 11 and which has, for example, a concave spherical mirror surface, a condenser lens 13 disposed in front of the light source 11, a holographic optical element 14 which is disposed in front of the condenser lens 13 and which serves as color separating/focusing means, a liquid crystal display unit (LCD) 15 disposed in front of the holographic optical element 14, a projection lens 16 disposed in front of the liquid crystal display unit 15, and a screen 17 on which an image is projected and focused.

Any type of light source capable of emitting white light containing red, green and blue components may be used as the light source 11. For instance, a metal halide lamp, halogen lamp, xenon lamp or the like can suitably be used. The condenser lens 13 condenses and collimates the white light coming from the light source 11 and guides the collimated light to the holographic optical element 14.

Figure 2:
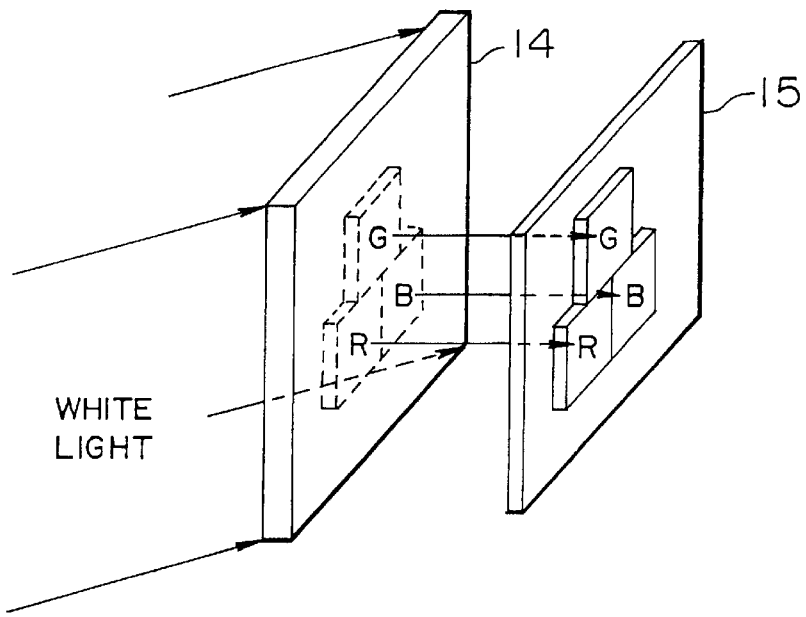
FIG. 2 is a schematic illustration explanatory of the function of a holographic optical element used in the display apparatus of the present invention.

The holographic optical element 14 is a transmissive holographic optical element of the type in which the diffraction efficiency has no wavelength dependency, rather than those having wavelength dependencies such as Lippmann's hologram which diffracts only specific wavelength. Thus, various types of transmissive holographic optical elements having no wavelength dependency may be used, such as those of relief type, phase type and amplification type. The holographic optical element 14 is made of, for example, a photo-polymer, e.g., Omnidex 352 produced by Du Pont. A plurality of interference fringes, which correspond to the arrays of pixels and colors on the liquid crystal display unit, are formed on the material by a process which will be described later. FIG. 2 shows the functions of the holographic optical element 14 in an exaggerated manner. The holographic optical element 14, upon receipt of the white light collimated by the condenser lens 13 and impinging thereon, separates the white light into three primary color components of red, green and blue, at separation angles corresponding to the arrangement of pixels on the liquid crystal display unit 15, and transmits the primary color light components. The holographic optical element 14 also has such a function as to direct the transmitted primary color light components to corresponding pixels on the liquid crystal display unit 15. Thus, the holographic optical element 14 serves as separating/focusing means which separates the incident white light into primary color light components and focuses the reproduced image (real image) onto the liquid crystal display unit 15.

Figure 3:
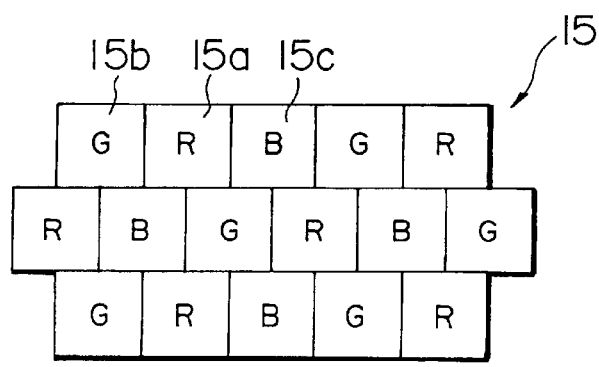
FIG. 3 is an illustration of pixel arrays on a liquid crystal display unit incorporated in the display apparatus shown in FIG. 1.

As will be seen from FIG. 3, the liquid crystal display unit 15 has numerous pixels (liquid crystal cells) which include pixels 15a, 15b and 15c corresponding respectively to red, green and blue colors. These pixels 15a, 15b and 15c are regularly arranged in a delta or triangular manner in which three adjacent pixels of different colors form a triangle as illustrated. More specifically, the liquid crystal display unit has a pair of glass substrates and a liquid crystal layer sandwiched therebetween. In order to drive the liquid crystal layer, three types of signal electrodes, i.e., the pixels 15a to 15c shown in FIG. 3, constituting matrix electrode structures are provided on the opposing inner surfaces of the glass substrates. The signal electrodes forming the pixels 15a to 15c each are made of a transparent conductive film, and are adapted to be supplied with driving signals corresponding to red, green and blue colors. At the same time, the signal electrodes constituting the pixels 15a to 15c of red, green and blue colors receive light components of the respective colors coming from the holographic optical element 14. Thus, the light of each color incident to each of the three types of signal electrodes is subjected to an intensity modulation in accordance with the state of supply of the driving signal to the associated signal electrode.

The projection lens 16 has a function to synthesize an image from the light components which have been modulated and passed through the liquid crystal display unit 15, and to focus the image on the screen 17 at a greater scale.

Figure 5A:
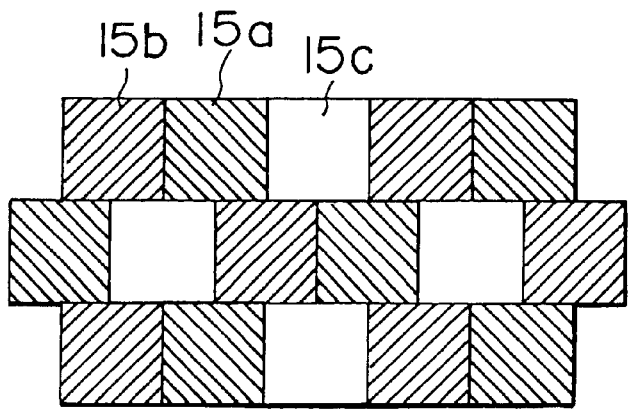
FIGS. 5A to 5C are illustrations of different states of light transmission through a liquid crystal display unit in different steps of the process for producing the a holographic optical element.
Figure 5B:
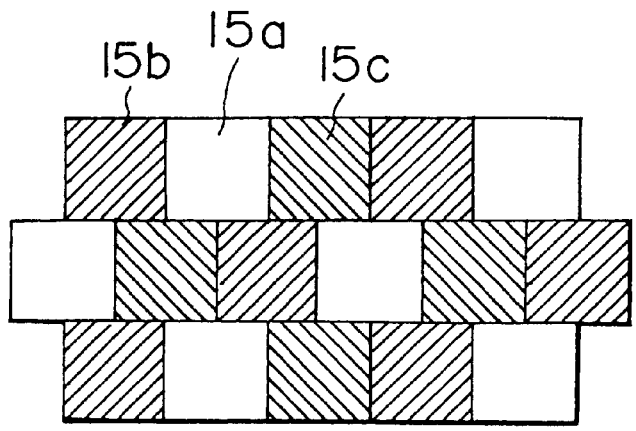
Figure 5C:
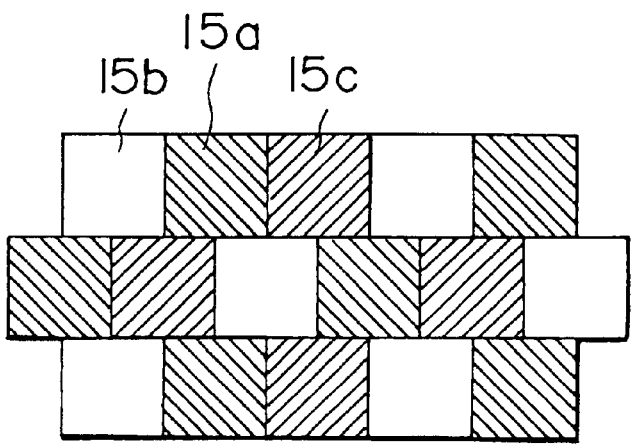

A description will now be given of a process of the invention for producing the holographic optical element 14, with specific reference to FIGS. 5A to 5C. This method employs an exposure mask having a construction conforming with the arrays of pixels and colors on the liquid crystal display unit 15 which, in the described embodiment, has the regular delta arrangement of the pixels corresponding to the three primary colors for the color display. The holographic optical element 14, which is capable of producing a reproduced image of a color arrangement conforming with the arrays of the pixels and colors on the liquid crystal display unit 15, can be obtained by performing selective exposure of a holographic optical element substrate through the exposure mask thus obtained.

Figure 4:
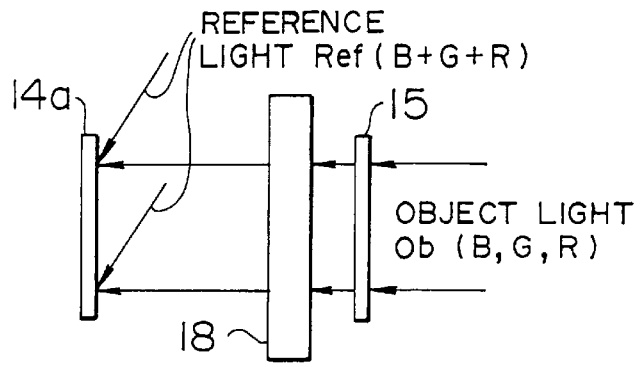
FIG. 4 is a schematic illustration explanatory of an embodiment of the process of the present invention for producing.

For instance, the liquid crystal display unit 15 itself, having the structure as shown in FIG. 4, is used as the exposure mask. When such an exposure mask is used, driving signals are supplied to the signal electrodes of the liquid crystal display unit 15 such that only the pixels of a specific color, e.g., pixels 15c corresponding to blue color, are set to a transmissive state, as shown in FIG. 5A, while pixels of other colors, i.e., pixels 15a and 15b are kept in a non-transmissive state. In this state, only blue color is transmitted through the liquid crystal display unit 15 and this blue light is applied as an object light Ob to a substrate member 14a which is to be used as the hologram substrate, through a focusing optical system 18. Reference light Ref is made to be incident to the member 14a together with the above-mentioned object light Ob, whereby a first group of interference fringes are formed by these two types of light. The same operation is conducted for the pixels of other colors, so that groups of interference fringes corresponding to such other colors are sequentially formed. More specifically, as shown in FIG. 5B, only pixels 15a corresponding to red color are set to a transmissive state, while the pixels corresponding to other colors, i.e., pixels 15b and 15c, are set to a non-transmissive state. Red light is transmitted through the liquid crystal display unit 15 to form an object light Ob which together with a reference light Ref impinge upon the member 14a, whereby a second group of interference fringes is formed. Then, only pixels 15b corresponding to green color are set to transmissive state, while the pixels corresponding to other colors, i.e., pixels 15a and 15c, are set to non-transmissive state, as shown in FIG. 5C. Green light is transmitted through the liquid crystal display unit 15 to form an object light Ob which together with a reference light Ref impinge upon the member 14a, whereby a third group of interference fringes is formed. A holographic optical element 15, having interference fringes corresponding to three primary colors, is obtained through these steps. The reference light Ref used in each exposure step may be the same light as the light transmitted through the liquid crystal display unit 15, or may be white light having red, green-and blue color components as shown in FIG. 4.

Figure 6:
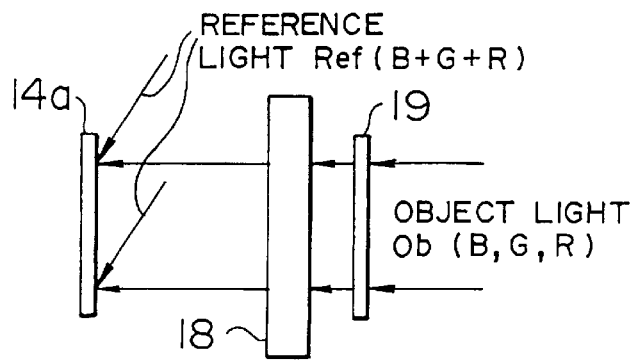
FIG. 6 is a schematic illustration explanatory of another embodiment of the process for producing holographic optical element.

In the embodiments described above, the liquid crystal display unit 15 itself is used as the exposure mask. This, however, is not exclusive and any other suitable exposure mask may be used provided that it has the same arrays of pixels and colors as the liquid crystal display unit 15 used in combination with the holographic optical element. For instance, a color filter shown in FIG. 6 may be used as the exposure mask. This color filter, denoted by 19, has the same arrangement or arrays of pixels and colors as those in the liquid crystal display unit 15. Light transmitted through this color filter is applied to the substrate member 14a as the object light Ob through the focusing optical system 18. At the same time, reference light Ref is made to be incident to the substrate member 14a. Thus, interference fringes corresponding to each color are formed by simultaneous application of these two types of light. The reference light Ref may be the same as the light transmitted through the color filter 19 or may be white light having red, green and blue light components, as in the case of the method which uses the liquid crystal display unit 15 as the exposure mask.

A description will now be given as to the operation of the illustrated embodiment of the projection liquid crystal display apparatus 10 incorporating the holographic optical element 14 produced by the described process. The white light emitted from the light source 11 and reflected by the reflector 12 is collimated by the condenser lens 13 into collimated beam which impinges upon the holographic optical element 14. Red, green and blue color components of the white light incident to the holographic optical element 14 are separated at angles corresponding to the arrangement of pixels on the liquid crystal optical element 15 and are made to be incident to corresponding pixels 15a, 15b and 15c of the liquid crystal display unit 15. The light components of the three primary colors are independently subjected to a spatial modulation and are then introduced to the projection lens 16. The modulated light components are then consolidated to form an image which is focused and displayed on the screen at a greater scale, whereby a color image display is performed.

The projection liquid crystal display apparatus of the described embodiment does not employ any color filter or combination of dichroic mirror and microlens which would serve as the color separating/focusing means, but uses an inexpensive holographic optical element 14 which serves as the color separating/focusing means. Consequently, interruption of incident light due to absorption or reflection, which is inevitable when a color filter is used, is eliminated, so that the incident light can be used more efficiently. In addition, color separation can be performed in conformity with the arrays of pixels (delta-type arrangement in the illustrated embodiment) on the liquid crystal display unit, whereby a color image can be displayed at higher level of brightness and with a high degree of color reproducibility, without requiring any restriction on the construction of the optical system. It is also to be pointed out that, the use of the holographic optical element 14, capable of efficiently forming a reproduced image (real image) on the liquid crystal display unit 15, eliminates the necessity for expensive microlenses, thus implementing inexpensive projection liquid crystal display apparatus 10.

Referring now to the described process for producing the holographic optical element, it is possible to easily obtain a holographic optical element 14 which provides a reproduced image having color arrangement conforming with the arrays of pixels and colors on the liquid crystal display unit 15, thanks to the use of an exposure mask which conforms with the arrays of pixels and colors on the liquid crystal display unit 15, i.e., the liquid crystal display unit 15 itself or a color filter 19. Furthermore, a more efficient use of luminescent energy can be achieved, thus offering an additional advantage, by selecting the wavelength of the object light Ob transmitted through the exposure mask in conformity with the spectrum of the light source 11 (see FIG. 1).

The foregoing embodiments are only illustrative and various changes and modifications may be imparted thereto. For instance, although the described embodiment of the projection liquid crystal display apparatus employs the liquid crystal display unit 15 having a delta-type arrangement of pixels, it is possible to use other types of pixel arrangement such as stripe-type arrangement. In such a case, it is necessary that the interference fringes of the holographic optical elements are formed in accordance with such arrangement of the pixels and colors on the liquid crystal display unit 15 as used.

It is also possible to use a reflection type holographic optical element in which the diffracted light appears at the same side of the holographic optical element as the light source, although the described embodiment employs a transmission-type holographic optical element in which the diffracted light appears on the opposite side of the holographic plane to the light source. When such a projection type holographic optical element is used, the direction of incidence of the reference light employed in the production of the holographic optical element should be conjugate to that of the reference light employed in the production of the transmission type holographic optical element.

In the described embodiment of the process for producing the holographic optical element, the interference fringes of the holographic element 14 are optically formed by using interference between two bundles of light. This, however, is not exclusive and the interference fringes conforming with the arrangement of pixels and colors of the liquid crystal display unit can be obtained through computation by a computer. Namely, a holographic optical element equivalent to those used in the foregoing embodiment can be obtained through computation incorporating the conditions described in the foregoing description.

As will be understood from the foregoing description, the present invention offers the following advantages. Firstly, it is possible to obtain an inexpensive projection liquid crystal display apparatus, while enabling efficient use of the incident light, thanks to the use, as the color separating/focusing means, of a holographic optical element which has interference fringes conforming with the arrays of pixels and colors on the liquid crystal display unit and which separates the incident light into three primary color light components and which directs these light components to corresponding pixels. In addition, color separation and focusing are performed in conformity with the arrangements of pixels and colors of the liquid crystal display unit, without requiring any restriction ion the construction of the optical system, whereby a color image can be displayed with high degree of color reproducibility and at high level of brightness.

The process of the invention for producing a holographic optical element of a projection liquid crystal display apparatus makes it possible to easily obtain a holographic optical element which provides a reproduced image (real image) having color arrangement conforming with the arrays of pixels and colors on the liquid crystal display unit, and which has both color separating and focusing functions, by virtue of the use of an exposure mask which conforms with the arrays of pixels and colors on the liquid crystal display unit, e.g., the liquid crystal display unit itself or a color filter. In addition, luminescent energy can efficiently be used, when the wavelength of the object light ob transmitted through the exposure mask is selected in conformity with the spectrum of the light source.

A description will now be given of a different embodiment of the method of producing a holographic optical element for use in a projection liquid crystal display apparatus. Description of the whole projection liquid crystal display apparatus is omitted because it is materially the same as that described before with reference to FIG. 1.

Figure 7:
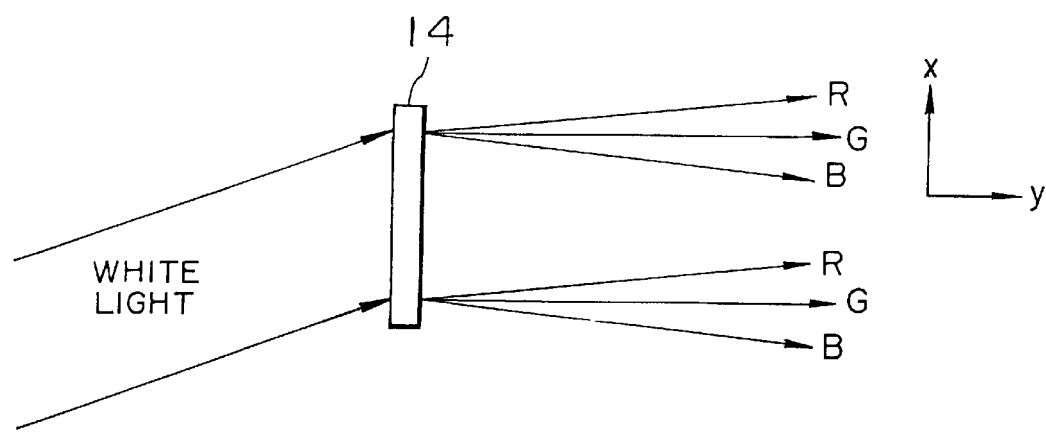
FIG. 7 is an illustration of the state of transmission of light through the holographic optical element of the display apparatus shown in FIG. 1, as viewed from the upper side of the display apparatus.
Figure 8:
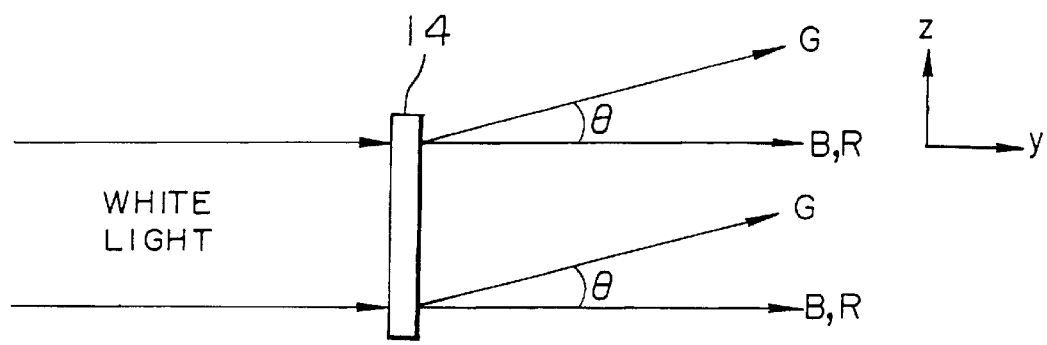
FIG. 8 is an illustration of the state of transmission of light through the holographic optical element of the display apparatus shown in FIG. 1, as viewed from a lateral side of the display apparatus.

FIG. 7 illustrates the state of transmission of light through the holographic optical element 14 as observed from the upper side of the projection liquid display apparatus in which the holographic optical element 14 is to be incorporated. Referring to this Figure, a three dimensional coordinate system is assumed such that the y axis extends in the horizontal direction, i.e., left to right direction, as viewed on the drawing sheet, while the x axis extends in the vertical direction, i.e., bottom to top direction, of the drawing sheet. Thus, the z axis is assumed to extend perpendicularly to the plane of the sheet which contains the x and y axes. FIG. 8 shows the state of transmission of light through the holographic optical element 14 as viewed from a lateral side of the projection liquid crystal display apparatus. Thus, the y-axis extends in the horizontal direction and the z axis extends in the vertical direction, while the x axis is normal to the plane of the drawing sheet. In this embodiment, as will be seen from FIG. 8, the red and blue primary color light components R and B are emitted to pass a common plane which is given by the x and y axes, perpendicular to the pixel plane and normal to the plane of the drawing sheet when viewed in FIG. 8. The red and blue primary color light components R and B, when viewed from the upper side as in FIG. 7, are directed in different directions, forming an angle corresponding to the arrangement of the pixels on a liquid crystal display unit 115 which will be described later. Meanwhile, the green light component G emitted from the holographic optical element 14 has a z component: namely, it runs in the x-z plane perpendicular to the x-y plane, so as to form an angle θ to the x-y plane, as will be seen from FIG. 8. The green color light component G, when viewed from the upper side as in FIG. 7, runs in a direction different from the directions of the red and blue color light components R and B, at an angle corresponding to the arrangement of the pixels on the liquid crystal display unit 115. The above-mentioned angle θ at which the green primary color component G is transmitted is determined in accordance with the arrangement of pixels on the liquid crystal display unit 115 which has, as will be described later in connection with FIG. 9, a so-called delta pixel arrangement, more specifically, in accordance with the positional relationship of a green pixel 115b to red and green pixels 115a, 115c.

Figure 9:
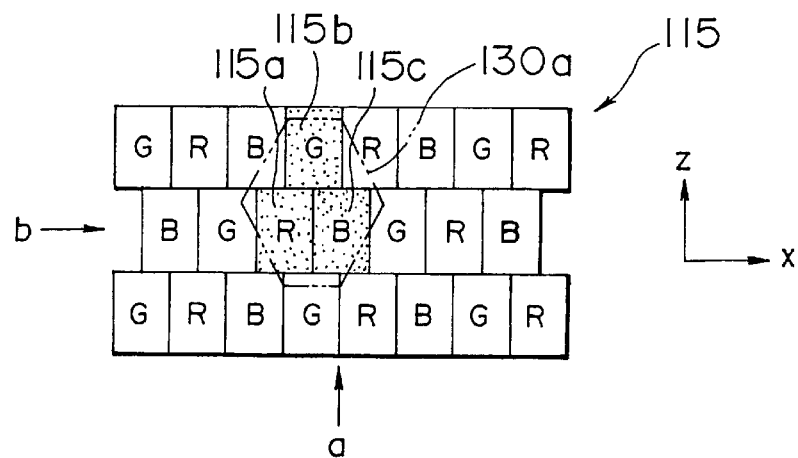
FIG. 9 is a front elevational view of a portion of a liquid crystal display unit incorporated in the display apparatus, illustrative of a delta arrangement of the pixels on the display unit.

Referring to FIG. 9, a pixel module includes three pixels: namely, red, green and blue pixels (liquid crystal cells) 115a, 115b and 115c which are disposed in accordance with the delta or triangular pixel arrangement described before. The liquid crystal display unit 115 has a plurality of pixels in the form of a periodic and regular repetition of such pixel modules, in the manner shown in FIG. 9. In FIG. 9, the aforementioned x axis extends in the horizontal, i.e., right to left, direction, while the z axis extends in the vertical, i.e., up and down direction, while the y axis is normal to the plane of the drawing sheet. The x-axis direction will be refereed to as a "first direction" and the z-axis direction will be referred to as a "second" direction. In this embodiment, a pixel module has the red and blue pixels 115a and 115c which are juxtaposed in the x-axis direction, i.e., first direction, while the green pixel 115b is juxtaposed along the z-axis direction, i.e., second direction.

Figure 10A:
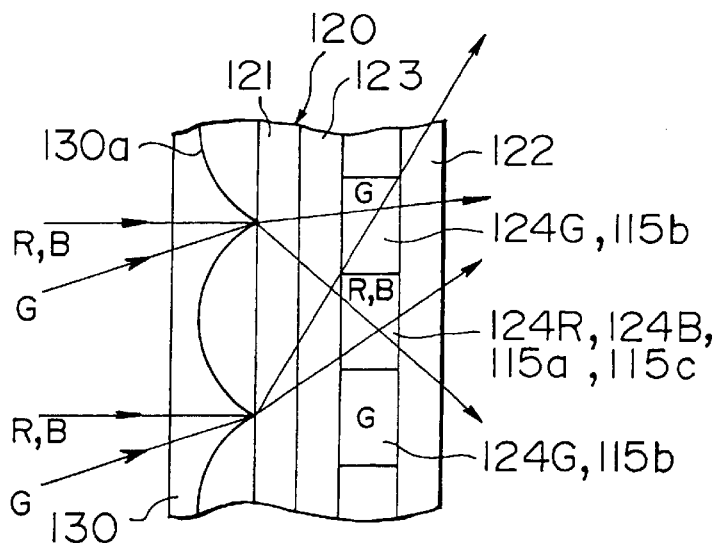
FIGS. 10A and 10B are sectional views of the liquid crystal display Unit incorporated in the projection liquid crystal display apparatus.
Figure 10B:
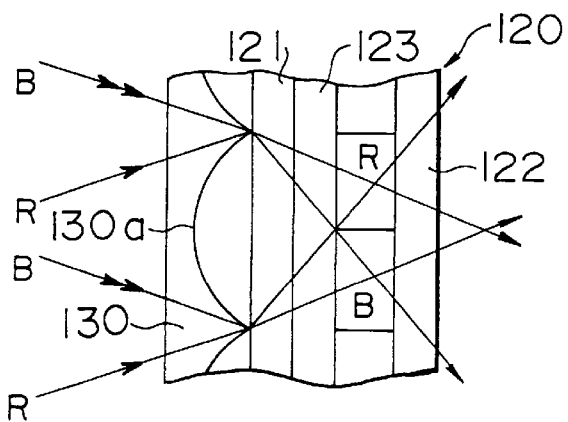

More specifically, as shown in FIGS. 10A and 10B, the liquid crystal display unit 115 has a unit body 120 and a microlens assembly 130 provided on the light incident side of the unit body 120 and serving as light condensing means. FIG. 10A is a sectional view of the pixel module as viewed in the direction of an arrow "b" in FIG. 9, while FIG. 10B is a sectional view of the same as viewed in the direction of the arrow "a". The unit body 120 includes a pair of glass substrates 121 and 122 and a liquid crystal layer 123 confined therebetween. Signal electrodes 124R, 124G and 124B arranged in a matrix form and scanning electrodes, which in cooperation drive the liquid crystal layer 123, are provided on the inner surfaces of the glass substrates 121, 122. The microlens assembly 130 has a plurality of microlenses 130a. The arrangement is such that one microlens 130a opposes to the three pixels 115a, 115b and 115c of one pixel module, i.e., to the signal electrodes 124R, 124G and 124B. The signal electrodes 124R, 124G and 124B are adapted to be supplied with driving signals corresponding to the red, green and blue colors, respectively. As will be seen from FIGS. 10A and 10B, the signal electrode 124R receives, through the microlens 130a, the red light R which has been passed through the holographic optical element 14. Similarly, the signal electrode 124G receives the green light G which has passed the holographic optical element 14, through the microlens 130a. The blue light B which has been transmitted through the holographic optical element 14 impinges upon the signal electrode 124B, through the microlens 130a. Thus, the intensities of the color light components received by the signal electrodes 124R, 124G and 124B are modulated in accordance with the states of supply of the driving signals which are supplied to the signal electrodes 124R, 124B and 124G in accordance with the image to be reproduced. A polarization plate, aligning film and other components of the liquid crystal display unit are omitted in the drawings for the purpose of simplification.

Figure 11A:
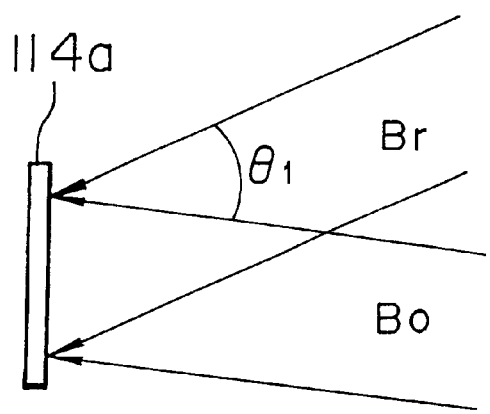
FIGS. 11A, 11B and 11C are illustrations of steps of a process for producing a holographic optical element suitable for use in the display apparatus shown in FIG. 1, as viewed from the upper side of the display apparatus in which the holographic optical element is to be incorporated.
Figure 11B:
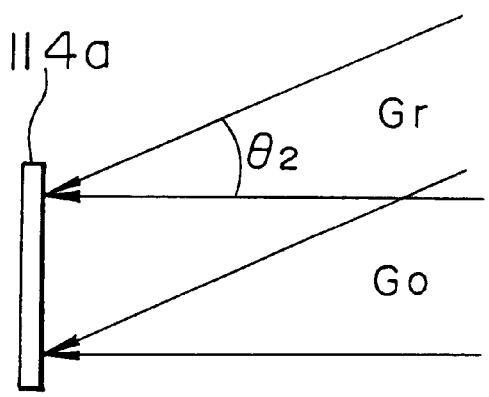
Figure 11C:
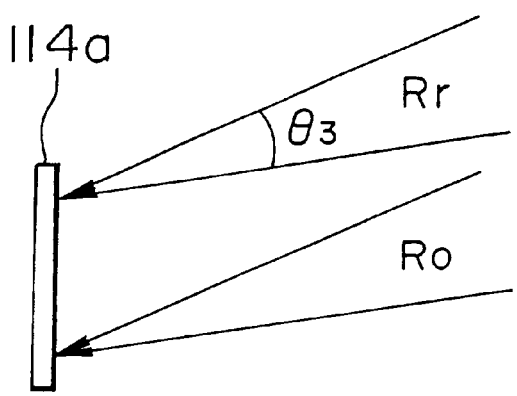
Figure 12A:
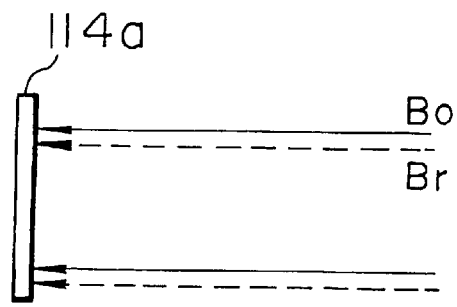
FIGS. 12A, 12B and 12C are illustrations of steps of a process for producing a holographic optical element suitable for use in the display apparatus shown in FIG. 1, as viewed from a lateral side of the display apparatus in which the holographic optical element is to be incorporated.
Figure 12B:
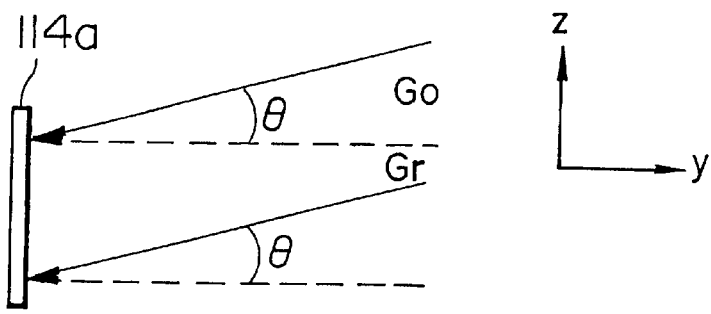
Figure 12C:
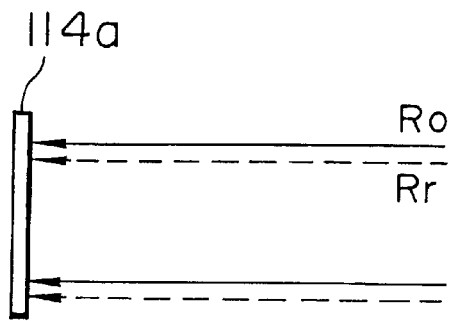

The holographic optical element 14 set forth above is produced by a process which will now be described with specific reference to FIGS. 9, 11A to 11C and 12A to 12C. FIGS. 11A to 11C are illustrations of steps of the process for producing a holographic optical element suitable, as viewed from the upper side of the display apparatus in which the holographic optical element is to be incorporated, while FIGS. 12A to 12C are illustrations of the steps of the process as viewed from a lateral side of the display apparatus.

Referring first to FIG. 11A, a laser light for blue color, serving as a reference light Br is applied to a 10 μm thick substrate member 114a which is to constitute the substrate of the holographic optical member. Simultaneously, an object light Bo is applied to the substrate member 114a such that an angle $θ_1$, corresponding to the arrangement of the blue pixels 115c of the liquid crystal display unit 115, is formed between the reference light Br and the object light Bo. Consequently, interference fringes corresponding to the blue pixels 115C are formed by the interference between these two types of light Br and Bo. When such interference fringes for the blue pixels 115c are formed, both the optical system for the reference light and the optical system for the object light (both optical system not shown) are disposed on a common plane (x-y plane), so that the object light Bo and the reference light Br are applied through the same plane (x-y) plane as will be seen from the side view in FIG. 12A.

Then, as shown in FIG. 11B, a laser light for green color, serving as a reference light Gr, is applied to the same substrate member 114a, together with an object light Go, such that the object light Go forms with respect to the reference light Gr an angle $θ_2$ corresponding to the arrangement of the green pixels 115b of the liquid crystal display unit 115. Consequently, interference fringes corresponding to the green pixels 115b are formed by the interference between these two types of light Gr and Go. When such interference fringes for the green pixels 115b are formed, unlike the formation of the interference fringes corresponding to the blue pixels 115c described above, the optical system for the object light Go is disposed in a z-plane perpendicular to the x-y plane, so that the object light Go forms the aforesaid predetermined angle θ to the reference light Gr which is applied through the x-y plane, as will be seen from the side view in FIG. 12B.

Then, as shown in FIG. 11C, a laser light for red color, serving as a reference light Rr, is applied to the same substrate member 114a together with an object light Ro such that an angle $θ_3$, corresponding to the arrangement of the red pixels 115a of the liquid crystal display unit 115, is formed between the reference light Or and the object light Oo. Consequently, interference fringes corresponding to the red pixels 115a are formed by the interference between these two types of light Rr and Ro. When such interference fringes for the red pixels 115a are formed, as in the case of the formation of the interference fringes for the blue pixels 115c, both the optical system for the reference light and the optical system for the object light (both optical system not shown) are disposed on a common plane (x-y plane), so that the object light Ro and the reference light Rr are applied through the same plane (x-y) plane as will be seen from the side view in FIG. 12C. It is thus possible to form, on the substrate member 114a, interference fringes corresponding to the delta arrangement of the blue, green and red pixels.

The angle of incidence of the three types of reference light Gr, Rr and Br is set to be the same as the angle at which the white light from the light source 11 is incident to the substrate member 114a. It is necessary that the angles $θ_1$, $θ_2$ and $θ_3$ of the respective object lights Go, Ro and Bo to the reference light Gr, Rr, Br are determined based not only on the pitch of arraying of the pixels of the respective colors but also the focal length of the microlens 130a shown in FIGS. 10A and 10B.

A description will now be given as to the operation of the projection liquid crystal display apparatus 10 incorporating the holographic optical element 14 produced by the described process. The white light emitted from the light source 11 and reflected by the reflector 12 is collimated by the condenser lens 13 into collimated beam which impinges upon the holographic optical element 14. Red, green and blue color light components of the white light incident to the holographic optical element 14 are separated by the holographic optical element at different angles as shown in FIG. 7 and, through the microlens 130a, impinge upon the pixels 115a, 115b and 115c of the corresponding colors on the liquid crystal display unit 115. The light components of the three primary colors received by the liquid crystal display unit 115 are independently subjected to spatial modulation in accordance with the image to be reproduced by the liquid crystal display unit 115 and are then introduced to the projection lens 16. The modulated light components are then consolidated to form an image which is focused and displayed on the screen 17 at a greater scale, whereby a color image display is performed.

As will be understood from the foregoing description, the holographic optical element 14 of the projection liquid crystal display apparatus 10 is constructed such that the red and blue primary color light components coming out the holographic optical element 14 run in the same plane (x-y plane) as will be seen from the side view in FIG. 8 but in different directions as will be seen from the plan view in FIG. 7, while the green primary color light component coming out of the same element 14 is directed to form the predetermined angle θ to the x-y plane, whereby the primary color light components of red, green and blue colors are properly introduced to the corresponding pixels 115a, 115b and 115c on the liquid crystal display unit 115.

In addition, the holographic optical element 14 produced in accordance with the described embodiment can separate the primary color light components in conformity with the delta arrangement of the pixels 115a to 115c on the liquid crystal display unit 115, so that microlens 130a serving as the light condensing means can have a hexagonal configuration approximating a circle, in conformity with the delta arrangement of the pixels, as shown in FIG. 9. This facilitates the work to be done on the microlens and reduces wasteful portion of the microlens which does not contribute to light condensation, thus offering a higher light condensing efficiency. Furthermore, inexpensive projection liquid crystal display apparatus can be obtained by virtue of the use of the holographic optical element as the color separating means.

In addition, the described embodiment of the production process permits easy production of the holographic optical element 14 having the described color separating function. In addition, it is possible to make an efficient use of the light emission energy when the wavelengths of the object light rays used in the production of the holographic optical element are selected to fall within the spectrum of the light source.

The production process described with reference to FIGS. 7 to 12C is only illustrative and various changes and modifications may be imparted thereto. For instance, the sequence of the a multiplexed exposure in the production of the holographic optical element 14, which is in the order of blue, green and red in the illustrated embodiment, may be varied and suitably determined in accordance with the magnitudes of incident angles. The use of multiplexed exposure technique also is illustrative and the holographic optical element 14 may be produced by a simultaneous exposure technique in which exposures for forming interference fringes for different colors are performed simultaneously.

It is also to be noted that the delta or triangular arrangement of the pixels on the liquid crystal display unit 115 is not essential. Namely, the projection liquid crystal display apparatus may incorporate a liquid crystal display unit 115 of other type of pixel arrangement such as mosaic arrangement. In such a case, the interference fringes on the holographic optical element should be formed in conformity with such a pixel arrangement.

It is also possible to use a reflection type holographic optical element in which the diffracted light appears at the same side of the holographic optical element as the light source, although the described embodiment employs a transmission-type holographic optical element in which the diffracted light appears on the opposite side of the holographic plane to the light source. When such a projection type holographic optical element is used, the direction of incidence of the reference light employed in the production of the holographic optical element should be conjugate to that of the reference light employed in the production of the transmission type holographic optical element. It is also possible to use other types of light than the laser light, as the reference light and the object light employed in the production of the holographic optical element.

In the described embodiment of the process for producing the holographic optical element, the interference fringes of the holographic element 14 are optically formed by using interference between two bundles of light. This, however, is not exclusive and the interference fringes conforming with the arrangement of pixels and colors of the liquid crystal display unit can be obtained through computation by a computer. Namely, a holographic optical element equivalent to that described in the foregoing can be obtained through computation incorporating the conditions described in the foregoing description.

A description will now be given of a further embodiment of the present invention. The construction of the whole projection liquid crystal display apparatus is materially the same as that explained before with reference to FIG. 1, so that description of the whole apparatus is omitted.

Figure 13:
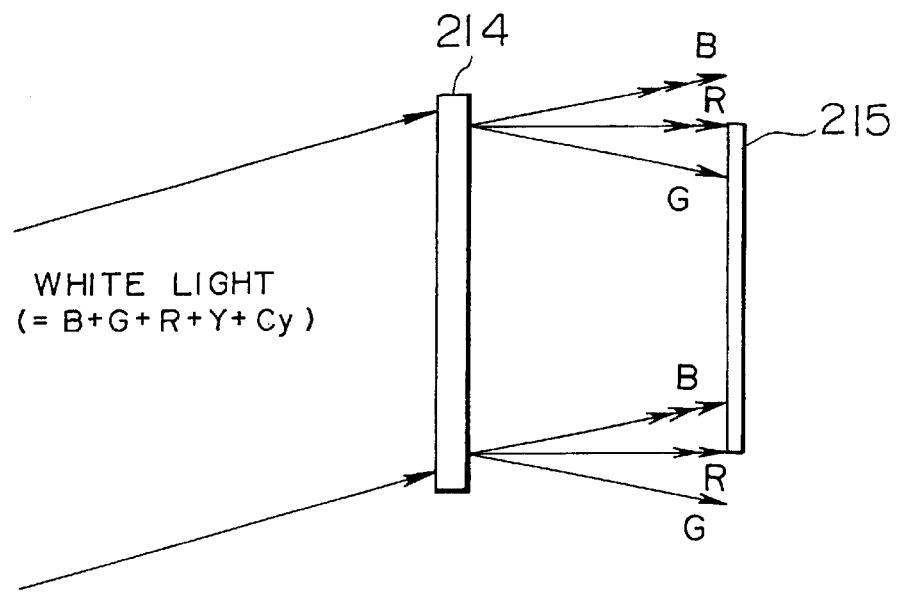
FIG. 13 is an illustration explanatory of the function of a holographic optical element incorporated in the projection liquid crystal display apparatus shown in FIG. 1.

Referring to FIG. 13, the holographic optical element 214 used in this embodiment is a transmissive holographic optical element of the type in which the diffraction efficiency has no wavelength dependency, rather than those having wavelength dependencies such as Lippmann's hologram which diffracts only specific wavelength. Thus, various types transmissive holographic optical elements having no wavelength dependency may be used, such as those of relief type, phase type and amplification type. The holographic optical element 214 is made of, for example, a photopolymer, e.g., Omnidex 352 produced by Du Pont. A plurality of interference fringes, which correspond to red, green and blue primary colors and complementary colors are formed by a process which will be described later.

As will be seen from FIG. 13, the holographic optical element used in this embodiment, the holographic optical element 214 receives white light through the condenser lens 13 and separates the primary color light components of red, green and blue at angles corresponding to the pixel arrangement on the liquid crystal display unit 215 and directs these primary color light components to the liquid crystal display unit 215. The holographic optical element 214, however, directs the complementary color components other than the three primary colors, in particular cyan (C) and yellow (Y) components, to areas out of the area of the liquid crystal display unit 215. The mixing of color stated before is caused by light components of wavelengths near those of the three primary colors which are components necessary to implement color display. Thus, the problem caused by the mixing of colors is substantially overcome when a suitable measure is taken to eliminate influence of cyan color component (wavelength from 470 to 520 nm) adjacent the wavelengths of the blue and green light components and influence of yellow color component (wavelength from 57 to 600 nm) adjacent to the wavelengths of the green and red light components. In this embodiment, therefore, the holographic optical element 214 is so constructed as to prevent these complementary color light components from impinging upon the liquid crystal display device 215.

Figure 14:
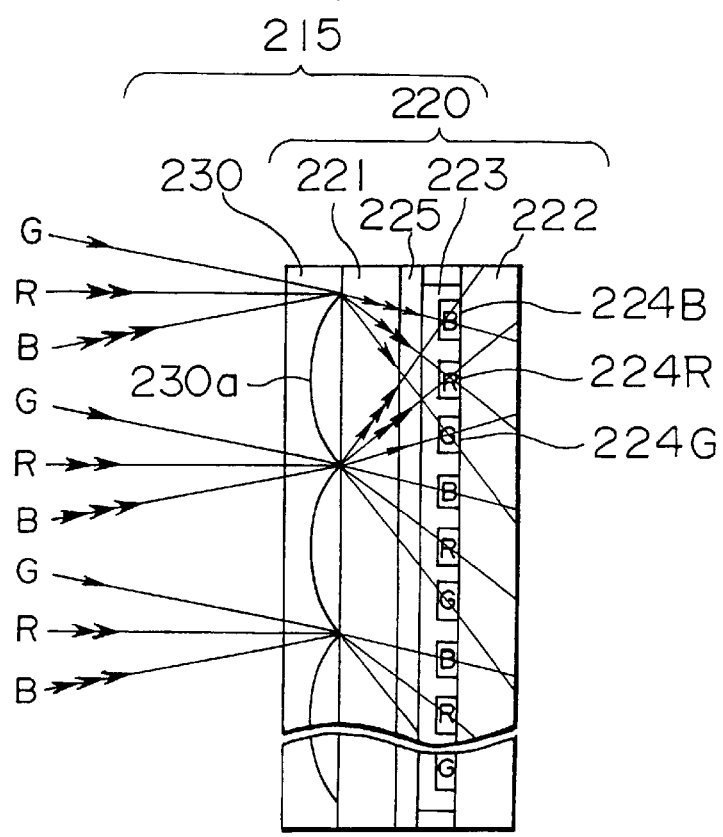
FIG. 14 is an illustration of the construction of a liquid crystal display unit incorporated in the projection liquid crystal apparatus shown in FIG. 1.

The liquid crystal display unit 215 has numerous pixels (liquid crystal cells) corresponding to the three primary colors of red, green and blue, arranged in a regular pattern such as delta or triangular arrangement described before. The liquid crystal display unit 215 performs spatial modulation of the color light components incident to the respective pixels in accordance with the image to be reproduced, and produces optical outputs in the form of modulated color light components. More specifically, as shown at a greater scale in FIG. 14, the liquid crystal display unit 215 is constituted mainly by a unit body 220 and a microlens array 230 provided on the incident side of the unit body 220 and serving as focusing means. The unit body 220 has a pair of glass substrates 221 and 222 and a liquid crystal layer 223 confined between these glass substrates 221, 222. Signal electrodes 224R, 224G and 224B arranged in the form of a matrix electrode, as well as a scanning electrode 225, for performing duty driving of the liquid crystal layer 223 are arranged on the inner surfaces of the glass substrates 221 and 222. The microlens array 230 has a plurality of microlenses 230a which extend in the direction perpendicular to the plane of the drawing sheet, in such a manner that one microlens 230a faces three pixels, i.e., three signal electrodes 224R, 224G and 224B. The signal electrodes 224R, 224G and 224B and the scanning electrode 225 are formed of transparent conductive films. The signal electrodes 224R, 224G and 224B are adapted to be supplied with driving signals corresponding to red, green and blue colors, respectively. The signal electrode 224R receives, through the microlens 230a, the red color light component transmitted through the holographic optical element 214. The signal electrode 224G receives, through the microlens 230a, the green color light component transmitted through the holographic optical element 214. Similarly, the signal electrode 224B receives, through the microlens 230a, the blue color light component transmitted through the holographic optical element 214. Thus, the intensities of the primary light components received by the signal electrodes 224R, 224G and 224B are modulated in accordance with the states of supply of the driving signals to the respective signal electrodes 224R, 224G and 224B, i.e., in accordance with the image to be reproduced. Although the liquid crystal display element also has other components such as a polarization plate, aligning film and so forth, these components are not shown in the drawings for the purpose of simplification of illustration.

The projection lens 16 serves to synthesize a color image from the primary color light components modulated and transmitted through the liquid crystal display unit 215 and focuses the synthesized image on the screen 17 in a greater scale.

A description will now be given of a process of producing the above-described holographic optical element, with specific reference to FIGS. 15A to 15C and FIGS. 16A and 16B.

Figure 15A:
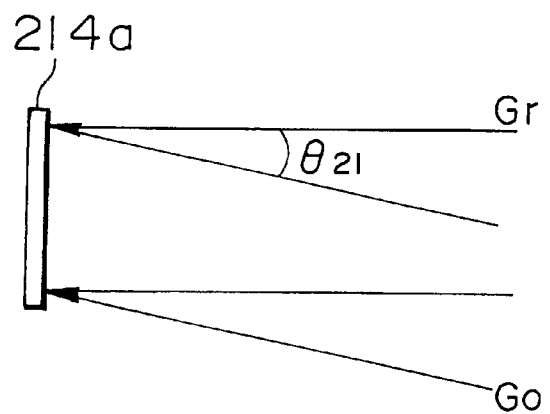
FIGS. 15A to 15C are illustrations of steps of a process for forming the holographic optical element shown in FIG. 13.

Referring to FIG. 15A, a laser light which serves as a reference light (Gr) for green color, is applied to a substrate member 214a which is a film of 10 μm thick and which is to constitute a substrate of the holographic optical element 214. At the same time, an object light Go is applied to this substrate member 214a such that the object light Go forms, with respect to the reference light Gr, an angle $\theta_{21}$ corresponding to the arraying of the green pixels on the liquid crystal display unit 215, whereby an interference fringe is formed by interference between the reference light Gr and the object light Go.

Figure 15B:
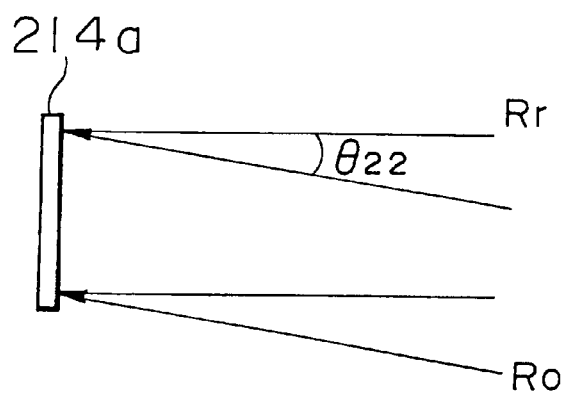

Then, as shown in FIG. 15B, a laser light which serves as a reference light (Rr) for red color, is applied to the substrate member 214a. At the same time, an object light Ro is applied to this substrate member 214a such that the object light Ro forms, with respect to the reference light Rr, an angle $\theta_{22}$ corresponding to the arraying of the red pixels on the liquid crystal display unit 215, whereby an interference fringe is formed by interference between the reference light Rr and the object light Ro.

Figure 15C:
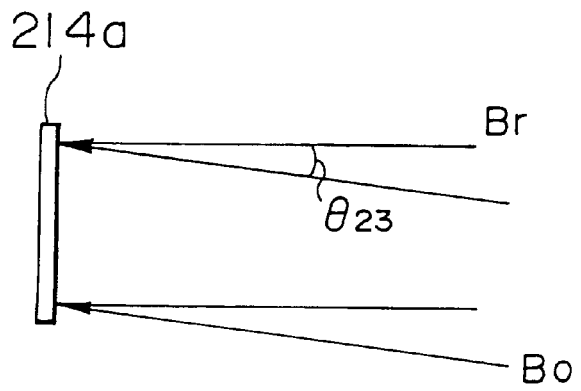

Subsequently, as shown in FIG. 15C, a laser light which serves as a reference light (Br) for blue color, is applied to the substrate member 214a. At the same time, an object light Bo is applied to this substrate member 214a such that the object light Bo forms, with respect to the reference light Br, an angle $\theta_{23}$ corresponding to the arraying of the blue pixels on the liquid crystal display unit 215, whereby an interference fringe is formed by interference between the reference light Br and the object light Bo. Consequently, interference fringes corresponding to the three primary colors of green red and blue light components necessary for the color display are formed on the substrate member 214a of the holographic optical element.

The angle of incidence of each reference light (Gr, Rr, Br) with respect to the substrate member 214a is set to be the same as the angle at which the white light emitted from the light source 11 impinges upon the substrate member 214a. In the illustrated embodiment, the white light is incident to the holographic plane perpendicularly thereto, as shown in FIG. 1. The angles $\theta_{21}$, $\theta_{22}$ and $\theta_{23}$ of incidence of the object light (Go, Ro, Bo) with respect to the corresponding reference light (Gr, Rr, Br) should be determined based on not only the pitch of arrangement of the pixels of the corresponding color but also the focal length of the microlens 230a.

Figure 16A:
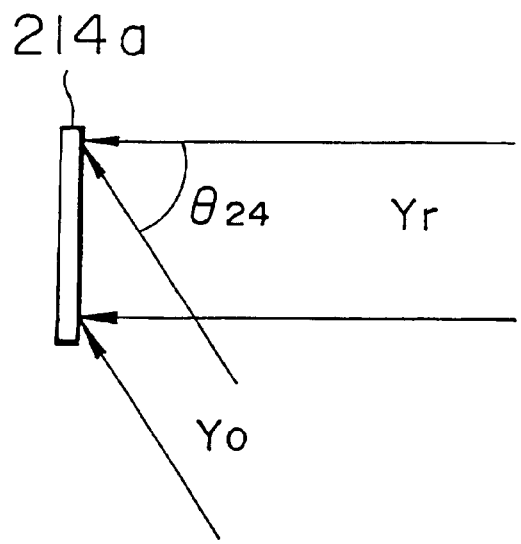
FIGS. 16A and 16B are illustrations of different steps of the process for forming the holographic optical element shown in FIG. 13.
Figure 16B:
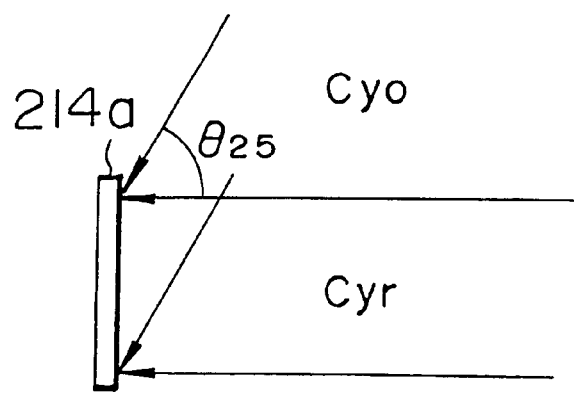

In this embodiment, interference fringes corresponding to complementary color components are also formed on the substrate member 214a on which the interference fringes corresponding to the three primary colors have been formed. More specifically, referring to FIG. 16A, a laser light which serves as a reference light (Yr) for a complementary color of yellow, is applied to the substrate member 214a. At the same time, an object light Yo is applied to this substrate member 214a such that the object light Yo forms an angle $\theta_{24}$ with respect to the reference light Yr, whereby an interference fringe is formed by interference between the reference light Yr and the object light Yo. Similarly, as shown in FIG. 16B, a laser light which serves as a reference light (Cyr) for a complementary color of cyan, is applied to the substrate member 214a. At the same time, an object light Cyo is applied to this substrate member 214a such that the object light Cyo forms an angle $\theta_{25}$ with respect to the reference light Cyr, whereby an interference fringe is formed by interference between the reference light Cyr and the object light Cyo. Consequently, interference fringes corresponding to the complementary colors of yellow (Y) and cyan (Cy) are formed on the substrate member 214a of the holographic optical element. It is to be noted that the angles $\theta_{24}$ and $\theta_{25}$ of incidence of the object light (Yo, Cyo) with respect to the corresponding reference light (Y, Cy) are determined such that the yellow and cyan complementary color light components transmitted through the holographic optical element 214 are directed to areas outside the area of the liquid crystal display unit 215. As in the case of the reference light used in the formation of interference fringes for the three primary colors, the reference light (Yr, Cyr) for forming the interference fringes corresponding to the complementary colors (Y, Cy) is made to be incident to the holographic optical element 214 at the same angle as that of incidence of the white light from the light source 11 into the holographic optical element 214. As stated before, in this embodiment, the white light is incident to the holographic plane perpendicularly thereto. In the formation of the interference fringes corresponding to the complementary colors, it is possible to use a laser capable of oscillating at multiplicity of wavelengths, such as a color laser.

In the operation of the projection liquid crystal display apparatus 10 having the holographic optical element 214 produced by the described process, the white light emitted from the light source 11 and reflected by the reflector 12 is collimated by the condenser lens 13 to form a collimated white light which then impinges upon the holographic optical element 214. The light components of the white color transmitted through the holographic optical element run at different angles corresponding to the wavelengths employed in the production of the holographic optical element. Namely, the light components of the three primary colors of green, red and blue colors are transmitted through the holographic optical element 214 while being separated at different angles from one another and are directed through the microlens 230a to the pixels on the liquid crystal display unit 215 corresponding to these primary colors. Meanwhile, the light components of the complementary colors (yellow and cyan) other than the three primary colors, which cause mixing of colors, are transmitted through the holographic optical element 214 so as to aim at areas out of the area of the liquid crystal display unit 215. The light components of the three primary colors received by the liquid crystal display unit 215 undergo spatial modulation performed by the liquid crystal display unit 215 in accordance with the image to be reproduced, and are then directed to the projection lens 16. The projection lens 16 then synthesizes a color image from the modulated color light components and focuses the synthesized image on the screen 17, whereby the color image is displayed on the screen 17.

As in the case of the preceding embodiment of the projection liquid crystal display apparatus, the apparatus of this embodiment employing the holographic optical element 214 as the color separating means offers advantages over known display apparatuses incorporating color filters as the color separating means. Namely, this embodiment offers a more efficient use of the incident light due to elimination or suppression of absorption or reflection of the incident light which would occur when color filters are used as the color separating means, as well as reduction in the price of the display apparatus. Besides these advantages common to the preceding embodiment, the embodiment described in connection with FIGS. 13 to 16B produces an advantage in that light components of complementary colors which cause mixing of colors are prevented from impinging upon the liquid crystal display unit 215, so that only the primary color light components are efficiently introduced into the liquid crystal display unit 215. Consequently, color images are displayed with a higher level of brightness and higher degree of color reproducibility. It is also to be noted that the described process of producing the holographic optical element can provide an optical system in which any desired wavelength is excluded, without difficulty and without being accompanied by an increase in the number of optical elements. Furthermore, the luminescent energy of the light source can be used more efficiently, when the wavelengths of the object light used in the production of the holographic optical member are selected to fall within the spectrum of the light source.

The embodiment described with reference to FIGS. 13 to 16A also is illustrative and various changes and modifications may be imparted thereto. For instance, the sequence of the multiplexed exposure in the production of the holographic optical element 214, which is in the order of green, red, blue, yellow and cyan in the illustrated embodiment, may be varied and suitably determined in accordance with the magnitudes of incident angles. The use of multiplexed exposure technique also is illustrative and the holographic optical element 214 may be produced by a simultaneous exposure technique in which exposures for forming interference fringes for different colors are performed simultaneously. Furthermore, the holographic optical element 214 may have interference fringes corresponding to an additional complementary color such as magenta.

It is also to be noted that the delta or triangular arrangement of the pixels on the liquid crystal display unit 215 is not essential. Namely, the projection liquid crystal display apparatus may incorporate a liquid crystal display unit 215 of other type of pixel arrangement such as stripe-type arrangement. In such a case, the interference fringes on the holographic optical element 214 should be formed in conformity with such a pixel arrangement.

In the embodiment described in connection with FIGS. 13 to 16B, elements such as the light source 11, condenser lens 13 and so forth are arranged on a common axis, so that the white light emitted from the light source 11 impinges upon the holographic optical element 214 perpendicularly thereto. Such an arrangement, however, is not exclusive and the positions of the light source 11, condenser lens 13 and so forth may be changed such that the white light emitted from the light source impinges upon the holographic optical element obliquely thereto. It is also possible to arrange such that the holographic optical element 214 is inclined with respect to the liquid crystal display unit 215. In any of these cases, the angles of incidence of reference lights used in the formation of the holographic interference fringes may be determined in accordance with the angle of incidence of the white light from the light source 11.

It is also possible to use a reflection type holographic optical element in which the diffracted light appears at the same side of the holographic optical element as the light source, although the described embodiment employs a transmission-type holographic optical element in which the diffracted light appears on the opposite side of the holographic plane to the light source. When such a projection type holographic optical element is used, the direction of incidence of the reference light employed in the production of the holographic optical element should be conjugate to that of the reference light employed in the production of the transmission type holographic optical element.

In the embodiment described with reference to FIGS. 13 to 16B, the exclusion of the complementary color components of the white light received by the holographic optical element is performed by directing these complementary light components above and below the primary light components within the x-y plane (plane of the drawing sheet of FIG. 13) so as not to impinge upon the liquid crystal display unit 215. The exclusion of the complementary light components, however, may be effected by arranging such that these complementary light components are deviated from the x-y plane, i.e., so as to have a component along a z-axis which is perpendicular to the plane of the drawing sheet. The use of laser light as the reference light and the object light is also illustrative, and the interference fringes may be formed by using light rays other than laser light, in the process for producing the holographic optical element.

In the described embodiment of the process for producing the holographic optical element, the interference fringes of the holographic element 14 are optically formed by using interference between two bundles of light. This, however, is not exclusive and the interference fringes conforming with the arrangement of pixels and colors of the liquid crystal display unit can be obtained through computation by a computer. Namely, a holographic optical element equivalent to that described in the foregoing can be obtained through computation incorporating the conditions described in the foregoing description.

Thus, the embodiment shown in FIGS. 13 to 16B employs, as the color separating means, a holographic optical element which separates the primary color light components and directs the same to the liquid crystal display unit, while directing the complementary color light components which would cause mixing of colors to areas out of the area of the liquid crystal display unit. It is therefore possible to obtain an inexpensive projection liquid crystal display apparatus which offers a higher efficiency of sue of the incident light and which reduces restriction imposed when the color separating means are incorporated in the optical system, while eliminating or suppressing mixing of color due to presence of complementary color components.

What is claimed is:

1. A process for producing a holographic optical element for use as a color separating/focusing means in a projection liquid crystal display apparatus which includes a liquid crystal display unit having arrays of a plurality of pixels corresponding to primary colors for color display, said method comprising the steps of:
   preparing an exposure mask having a structure conforming with the arrays of pixels on said liquid crystal display unit, said exposure mask comprising a liquid crystal display unit; and
   selectively exposing a substrate of the holographic optical element to be formed, through said exposure mask, whereby the arrays of reproduced images conform with the arrays of pixels on said liquid crystal display unit.

2. A process for producing a holographic optical element according to claim 1, comprising the steps of:
setting the pixels corresponding to a first color into a transmitting state among the pixels of said liquid crystal display unit; allowing light of a specific color as' an object light to be transmitted through said liquid crystal display unit; applying said object light to said substrate of the holographic element together with a reference light so as to form interference fringes; and executing the same steps for pixels of a second color so as to form interference fringes corresponding to the second color.

3. A process for producing a holographic optical element in a projection liquid crystal display apparatus of the type having a light source for emitting white light, a liquid crystal display unit having a regular arrangement of a plurality of pixel modules each of which includes a plurality of pixels arrayed both in a first arraying direction and a second arraying direction orthogonal to the first arraying direction, and said holographic optical element which separates the white light from said light source into a plurality of primary color light components in accordance with the arrays of pixels and directs the separated primary color light components to said liquid crystal display unit, and which has a plurality of interference fringes corresponding to said plurality of pixels, said process comprising the step of:
   forming said interference fringes on a substrate member for forming said holographic optical element, said forming step including:
   applying a reference light to said substrate member, such that said reference light is within a plane which contains a direction corresponding to said first arraying direction of said pixels of said liquid crystal display unit, and in a direction which forms an angle corresponding to the angle of incidence of the white light from said light source;
   applying to said substrate member an object light for forming an interference fringe corresponding to a pixel of a type arrayed in said first arraying direction among the pixels constituting said pixel module, in the same plane as said reference light and so as to form, with respect to said reference light, an angle corresponding to the arraying of said pixel in said first arraying direction; and
   applying to said substrate member an object light for forming an interference fringe corresponding to other type of pixels arrayed in said second arraying direction in said pixel module of said liquid crystal display unit, in a plane different than said reference light and so as to form, with respect to said reference light, an angle corresponding to the arraying of the pixel in said second arraying direction.

4. A projection liquid crystal display apparatus, comprising:
   a light source for emitting white light;
   a condenser lens which receives and collimates said white light;
   a liquid crystal display unit having arrays of a plurality of pixels corresponding to primary colors for color display;
   a holographic optical element which receives said collimated white light from said condenser lens and separates said collimated white light into light components corresponding to said primary colors and directs the separated primary color light components to said liquid crystal display unit, while directing complementary color light components to areas out of the area of said liquid crystal display unit;
   a projection lens for projecting an image synthesized in said liquid crystal display unit from said primary color light components; and
   a screen for displaying an image projected through said projection lens at a greater scale.

5. A projection liquid crystal display apparatus according to claim 4, wherein said complementary color components include cyan and yellow light components.

6. A process for producing a holographic optical element for use as a color separating/focusing means in a projection liquid crystal display apparatus which includes a liquid crystal display unit having arrays of a plurality of pixels corresponding to primary colors for color display, said method comprising the steps of:
   preparing an exposure mask having a structure conforming with the arrays of pixels on said liquid crystal display unit, said exposure mask comprising a color filter having the same arrays of pixels as those of a liquid crystal display apparatus; and selectively exposing a substrate of the holographic optical element to be formed, through said exposure mask, whereby the arrays of reproduced images conform with the arrays of pixels on said liquid crystal display unit.

7. A process for producing a holographic optical element according to claim 6, wherein light of each color transmitted through said color filter is applied together with a reference light to said substrate, thereby forming interference fringes corresponding to each color.

8. A process for producing a holographic optical element in a projection liquid crystal display apparatus of the type having a light source for emitting white light, a liquid crystal display unit having a regular arrangement of a plurality of pixel modules each of which includes a plurality of pixels arrayed both in a first arraying direction and a second arraying direction orthogonal to the first arraying direction, wherein said liquid crystal display unit comprises a microlens which serves as light condensing means for each said pixel module, and said holographic optical element which separates the white light from said light source into a plurality of primary color light components in accordance with the arrays of pixels and directs the separated primary color light components to said liquid crystal display unit, and which has a plurality of
interference fringes corresponding to said plurality of pixels, said process comprising the step of:

forming said interference fringes on a substrate member for forming said holographic optical element, said forming step including:

applying a reference light to said substrate member, such that said reference light is within a plane which contains a direction corresponding to said first arraying direction of said pixels of said liquid crystal display unit, and in a direction which forms an angle corresponding to the angle of incidence of the white light from said light source;

applying to said substrate member an object light for forming an interference fringe corresponding to a pixel of a type arrayed in said first arraying direction among the pixels constituting said pixel module, in the same plane as said reference light and so as to form, with respect to said reference light, an angle corresponding to the arraying of said pixel in said first direction; and applying to said substrate member an object light for forming an interference fringe corresponding to other type of pixels arrayed in said second arraying direction in said pixel module of said liquid crystal display unit, in a plane different than said reference light and so as to form, with respect to said reference light, an angle corresponding to the arraying of the pixel in said second arraying direction.

9. A process for producing a holographic optical element in a projection liquid crystal display apparatus of the type having a light source for emitting white light, a liquid crystal display unit having a regular arrangement of a plurality of pixel modules each of which includes a plurality of pixels arrayed both in a first arraying direction and a second arraying direction orthogonal to the first arraying direction, and said holographic optical element which separates the white light from said light source into a plurality of primary color light components in accordance with the arrays of pixels and directs the separated primary color light components to said liquid crystal display unit, and which has a plurality of interference fringes corresponding to said plurality of pixels, said process comprising the step of:

forming said interference fringes on a substrate member for forming said holographic optical element, said forming step including:

applying a reference light to said substrate member, such that said reference light is within a plane which contains a direction corresponding to said first direction of the arraying of said pixels of said liquid crystal display unit, and in a direction which forms an angle corresponding to the angle of incidence of the white light from said light source;

applying to said substrate member an object light for forming an interference fringe corresponding to a pixel of a type arrayed in said first arraying direction among the pixels constituting said pixel module, in the same plane as said reference light and so as to form, with respect to said reference light, an angle corresponding to the arraying of said pixel in said first direction; and applying to said substrate member an object light for forming an interference fringe corresponding to other type of pixels arrayed in said second arraying direction in said pixel module of said liquid crystal display unit, in a plane different than said reference light and so as to form, with respect to said reference light, an angle corresponding to the arraying of the pixel in said second arraying direction.

* * * * *

UNITED STATES PATENT AND TRADEMARK OFFICE
CERTIFICATE OF CORRECTION

PATENT NO. : 6,256,123 B1
DATED : July 3, 2001
INVENTOR(S) : Yoshikazu Hazama

It is certified that error appears in the above-identified patent and that said Letters Patent is hereby corrected as shown below:

<u>Title page,</u>
Item [57], ABSTRACT,
Line 17, delete "an"

Signed and Sealed this

Eighteenth Day of February, 2003

JAMES E. ROGAN
*Director of the United States Patent and Trademark Office*